United States Patent
Jaradi et al.

(10) Patent No.: US 12,240,405 B2
(45) Date of Patent: Mar. 4, 2025

(54) ADJUSTABLE SEAT AIRBAGS

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 18/295,862

(22) Filed: Apr. 5, 2023

(65) Prior Publication Data

US 2024/0336217 A1  Oct. 10, 2024

(51) Int. Cl.
*B60R 21/231* (2011.01)
*B60N 2/22* (2006.01)
*B60R 21/00* (2006.01)
*B60R 21/01* (2006.01)
*B60R 21/0136* (2006.01)
*B60R 21/015* (2006.01)
*B60R 21/02* (2006.01)

(52) U.S. Cl.
CPC ......... *B60R 21/23138* (2013.01); *B60N 2/22* (2013.01); *B60R 21/0136* (2013.01); *B60R 21/01512* (2014.10); *B60R 21/01554* (2014.10); *B60R 2021/0006* (2013.01); *B60R 2021/01204* (2013.01); *B60R 2021/01286* (2013.01); *B60R 2021/0273* (2013.01); *B60R 2021/23107* (2013.01); *B60R 2021/23146* (2013.01)

(58) Field of Classification Search
CPC ......... B60R 21/23138; B60R 21/0136; B60R 21/01512; B60R 21/01554; B60R 2021/0006; B60R 2021/01204; B60R 2021/01286; B60R 2021/0273; B60R 2021/23107; B60R 2021/23146; B60N 2/22; B60N 2/0272
See application file for complete search history.

(56) References Cited

U.S. PATENT DOCUMENTS

| | | | | |
|---|---|---|---|---|
| 7,802,809 B2 * | 9/2010 | Ryan | ..................... | B60R 21/213 280/730.2 |
| 9,039,035 B1 * | 5/2015 | Faruque | ................ | B60R 21/207 280/728.2 |
| 10,322,691 B2 * | 6/2019 | Ohmi | ..................... | B60R 21/231 |
| 10,427,634 B2 * | 10/2019 | Gandhi | .................. | B60R 21/01 |
| 10,821,928 B2 | 11/2020 | Deng et al. | | |
| 10,821,930 B2 * | 11/2020 | Malapati | ................. | B60R 21/16 |

(Continued)

FOREIGN PATENT DOCUMENTS

| | | | |
|---|---|---|---|
| DE | 102018206093 A1 * | 10/2019 | |
| JP | 2014043128 A | 3/2014 | |
| KR | 20210027599 A | 3/2021 | |

*Primary Examiner* — Kurt Philip Liethen
(74) *Attorney, Agent, or Firm* — Frank A. MacKenzie; Brooks Kushman P.C.

(57) ABSTRACT

An assembly includes a vehicle seat including a seat back, a first track mounted to the seat back, an upper airbag movable along the first track, a second track mounted to the seat back, a lower airbag movable along the second track, and a mechanical assembly configured to simultaneously move the upper airbag along the first track and the lower airbag along the second track in opposite directions.

19 Claims, 7 Drawing Sheets

(56) References Cited

U.S. PATENT DOCUMENTS

| | | | |
|---|---|---|---|
| 11,059,442 B2* | 7/2021 | Adler | B60R 21/23138 |
| 11,260,820 B1* | 3/2022 | Patel | B60R 21/207 |
| 11,364,869 B1* | 6/2022 | Lin | B60R 21/013 |
| 11,603,070 B1* | 3/2023 | Lozano Omana | B60R 21/207 |
| 11,639,147 B2* | 5/2023 | Jaradi | B60N 2/06 |
| | | | 280/730.2 |
| 11,648,906 B2* | 5/2023 | Deng | B60R 21/21 |
| | | | 280/730.2 |
| 2004/0232666 A1* | 11/2004 | Sato | B60R 21/23138 |
| | | | 280/730.2 |
| 2006/0022439 A1 | 2/2006 | Bayley et al. | |
| 2008/0238057 A1* | 10/2008 | Inoue | B60R 21/207 |
| | | | 280/736 |
| 2009/0096193 A1* | 4/2009 | Robins | B60R 21/02 |
| | | | 280/728.2 |
| 2010/0078921 A1* | 4/2010 | Ryan | B60R 21/231 |
| | | | 280/730.2 |
| 2014/0300088 A1* | 10/2014 | Fukawatase | B60R 21/13 |
| | | | 280/730.2 |
| 2020/0094766 A1* | 3/2020 | Malapati | B60R 21/01512 |
| 2020/0108747 A1* | 4/2020 | Sekizuka | B60N 2/42745 |
| 2020/0290549 A1* | 9/2020 | Buice | B60R 21/217 |
| 2020/0307484 A1 | 10/2020 | Adler | |
| 2022/0048459 A1* | 2/2022 | Kang | B60R 21/23138 |
| 2022/0219636 A1* | 7/2022 | Yamazaki | B60N 2/42745 |
| 2023/0339421 A1* | 10/2023 | Yamamoto | B60R 21/207 |

\* cited by examiner

ADJUSTABLE SEAT AIRBAGS

BACKGROUND

A side airbag is mounted to a seatback and is inflatable along a side of an occupant, specifically along the torso and/or hip of the occupant. The side airbag, for example, may be inflatable between the occupant and a vehicle door. The side airbag helps control the kinematics of the occupant in certain vehicle impacts that urge the occupant in a cross-vehicle direction, e.g., certain side impacts.

DETAILED DESCRIPTION

Figure 1:
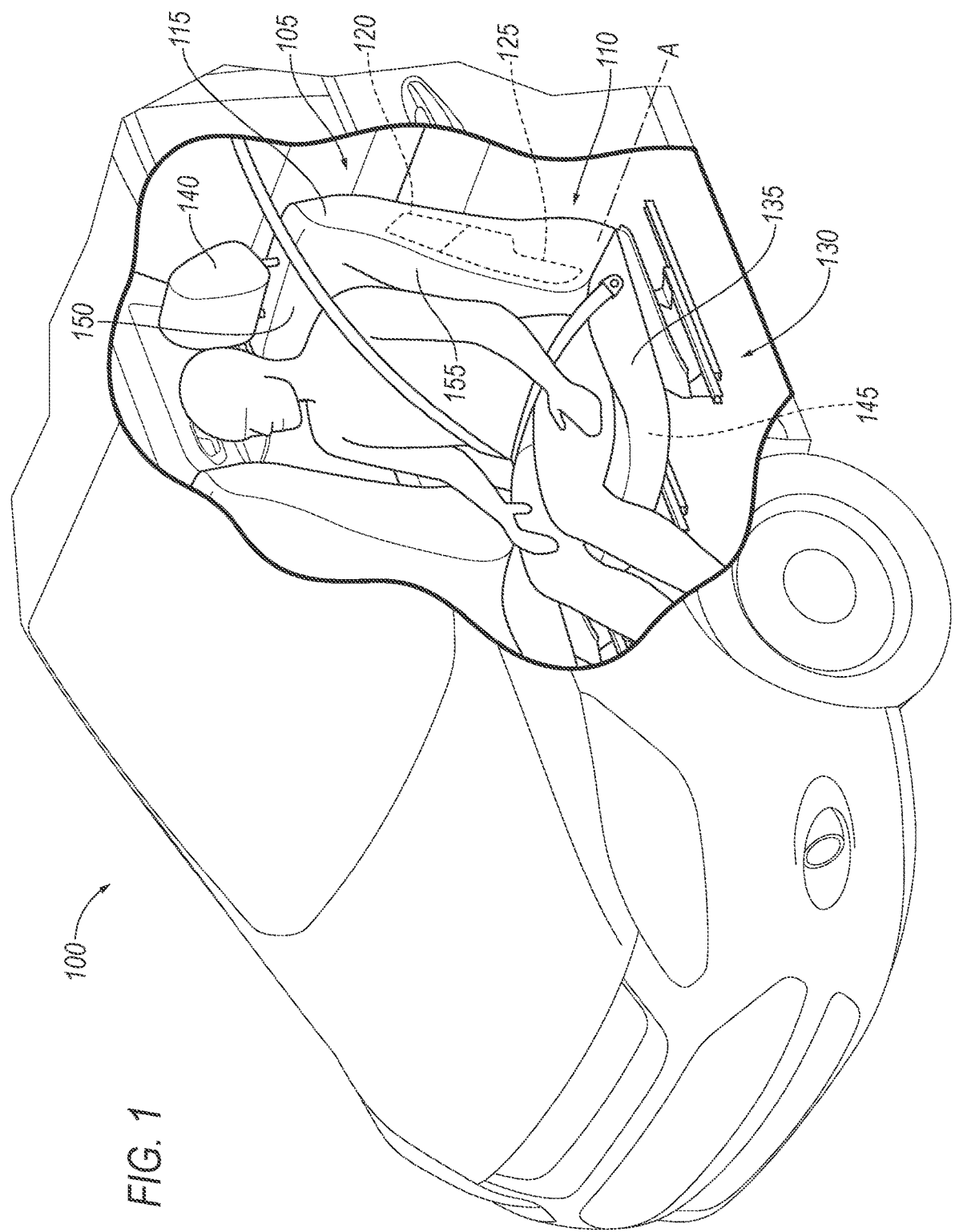
FIG. 1 is an example vehicle with a passenger compartment exposed for illustration.

An assembly includes a vehicle seat including a seat back, a first track mounted to the seat back, an upper airbag movable along the first track, a second track mounted to the seat back, a lower airbag movable along the second track, and a mechanical assembly configured to simultaneously move the upper airbag along the first track and the lower airbag along the second track in opposite directions.

In an example, the assembly may further include a computer communicatively coupled to the mechanical assembly, and the computer may be programmed to actuate the mechanical assembly to move the upper airbag along the first track and the lower airbag along the second track in opposite directions. In a further example, the computer may be programmed to actuate the mechanical assembly to move the upper airbag along the first track and the lower airbag along the second track in opposite directions based on a recline angle of the seat back. In a yet further example, the assembly may further include a position sensor communicatively coupled to the computer, and the computer may be further programmed to receive data indicating the recline angle from the position sensor.

In another yet further example, the computer may be further programmed to move the upper airbag and the lower airbag farther apart in response to an increase in the recline angle, and move the upper airbag and the lower airbag closer together in response to a decrease in the recline angle.

In another yet further example, the computer may be further programmed to move the upper airbag and the lower airbag to an extended position in response to the recline angle exceeding a threshold angle. In a still yet further example, the computer may be further programmed to move the upper airbag and the lower airbag to a retracted position in response to the recline angle being below the threshold angle, and the upper airbag and the lower airbag may be farther apart in the extended position than in the retracted position.

In another further example, the computer may be programmed to refrain from actuating the mechanical assembly in response to data indicating a lack of an occupant seated in the vehicle seat.

In an example, the mechanical assembly may include a motor and a gear assembly, and the gear assembly may be configured to configured to convert mechanical input from the motor to simultaneous translational motion of the upper airbag along the first track and the lower airbag along the second track in opposite directions. In a further example, the gear assembly may include a first rack slidable along the first track and a second rack slidable along the second track, the upper airbag may be mounted to the first rack, and the lower airbag may be mounted to the second rack. In a yet further example, the gear assembly may include a first pinion gear drivable by the motor and engaged with the first rack and a second pinion gear drivable by the motor and engaged with the second rack.

In an example, the vehicle seat may include a seat bottom, the seat back may be rotatable about a seat axis relative to the seat bottom, the seat back may have a length extending perpendicular to the seat axis, and the first track and the second track may be elongated along the length of the seat back. In a further example, the upper airbag in any position to which the upper airbag is movable along the first track may be farther from the seat bottom along the length than the lower airbag in any position to which the lower airbag is movable along the second track.

In an example, the first track and the second track may be elongated parallel to each other.

In an example, the upper airbag and the lower airbag may be inflatable from uninflated positions inside the seat back to inflated positions extending outward from the seat back. In a further example, the upper airbag and the lower airbag in the inflated positions may be positioned laterally from an occupant sitting in the vehicle seat.

In another further example, the assembly may further include a computer, and the computer may be programmed to inflate the upper airbag and the lower airbag from the uninflated positions to the inflated positions in response to data indicating a side impact to a vehicle including the assembly.

A computer includes a processor and a memory, and the memory stores instructions executable to simultaneously move an upper airbag along a first track and a lower airbag along a second track in opposite directions based on a recline angle of a seat back of a vehicle seat, the first track and the second track being mounted to the seat back.

A method includes simultaneously moving an upper airbag along a first track and a lower airbag along a second track in opposite directions based on a recline angle of a seat back of a vehicle seat, the first track and the second track being mounted to the seat back.

With reference to the Figures, wherein like numerals indicate like parts throughout the several views, an assembly 105 of a vehicle 100 includes a vehicle seat 110 including a seat back 115, a first track 305 mounted to the seat back 115, an upper airbag 120 movable along the first track 305, a second track 310 mounted to the seat back 115, a lower airbag 125 movable along the second track 310, and a mechanical assembly 500 configured to simultaneously move the upper airbag 120 along the first track 305 and the lower airbag 125 along the second track 310 in opposite directions.

In the event of certain impacts, e.g., certain side impacts, to the vehicle 100, the upper airbag 120 and the lower airbag 125 inflate from uninflated positions to inflated positions.

The upper airbag 120 in the inflated position may be positioned next to a head and shoulder of an occupant sitting in the seat, and the lower airbag 125 in the inflated position may be positioned next to a pelvis of the occupant. By moving the upper airbag 120 and the lower airbag 125 in opposite directions, the mechanical assembly 500 may maintain the positions of the upper airbag 120 and lower airbag 125 relative to the occupant, e.g., when the occupant reclines the seat back 115. For example, the mechanical assembly 500 may move the lower airbag 125 downward along the seat back 115 and the upper airbag 120 upward along the seat back 115 in response to the reclining of the seat back 115. Thus, the upper airbag 120 in the inflated position may be positioned next to the head and shoulder of the occupant both when the seat back 115 is upright and when the seat back 115 is reclined, and the lower airbag 125 may be positioned next to the pelvis of the occupant both when the seat back 115 is upright and when the seat back 115 is reclined.

The assembly 105 may be used in a vehicle 100 that is nonautonomous, semi-autonomous, or fully autonomous. For nonautonomous and semi-autonomous vehicles 100, the mechanical assembly 500 may be configured to simultaneously move the upper airbag 120 along the first track 305 and the lower airbag 125 along the second track 310 in opposite directions at relatively small recline angles of the seat back 115, e.g., less than 30° (smaller than shown in FIGS. 2 and 4), as greater recline angles are not recommended while operating the vehicle 100. For fully autonomous vehicles 100, the mechanical assembly 500 may be configured to simultaneously move the upper airbag 120 along the first track 305 and the lower airbag 125 along the second track 310 in opposite directions at the same or at relatively greater recline angles of the seat back 115, in conjunction with other safety features to address risks associated with large recline angles.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a passenger compartment 130 to house occupants of the vehicle 100. The passenger compartment 130 may include one or more of the vehicle seats 110 disposed in a front row of the passenger compartment 130 and one or more of the vehicle seats 110 disposed in a second row behind the front row. The passenger compartment 130 may also include vehicle seats 110 in a third-row (not shown) at a rear of the passenger cabin. The vehicle seats 110 may be bucket seats (as shown in the Figures), bench seats, etc. The position and orientation of the vehicle seats 110 and components thereof may be adjustable by an occupant.

Each vehicle seat 110 may include the seat back 115, a seat bottom 135, and a head restraint 140. The head restraint 140 may be supported by the seat back 115 and may be stationary or movable relative to the seat back 115. The seat back 115 may be supported by the seat bottom 135 and is rotatable relative to the seat bottom 135, e.g., about a seat axis A. The seat back 115 has a length extending perpendicular to the seat axis A. The seat back 115, the seat bottom 135, and/or the head restraint 140 may be adjustable in multiple degrees of freedom. Specifically, the seat back 115, the seat bottom 135, and/or the head restraint 140 may themselves be adjustable, in other words, adjustable components within the seat back 115, the seat bottom 135, and/or the head restraint 140, and/or may be adjustable relative to each other.

The vehicle seat 110 includes a seat frame 145. The seat frame 145 may include tubes, beams, etc. The seat frame 145 may include a pair of upright frame members in the seat back 115. The upright frame members may be elongated, e.g., along the length of the seat back 115. The upright frame members may be spaced from each other, and the seat frame 145 may include one or more cross-members extending between the upright frame members. The seat frame 145, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame 145 may be formed of a suitable metal, e.g., steel, aluminum, etc.

Figure 2:
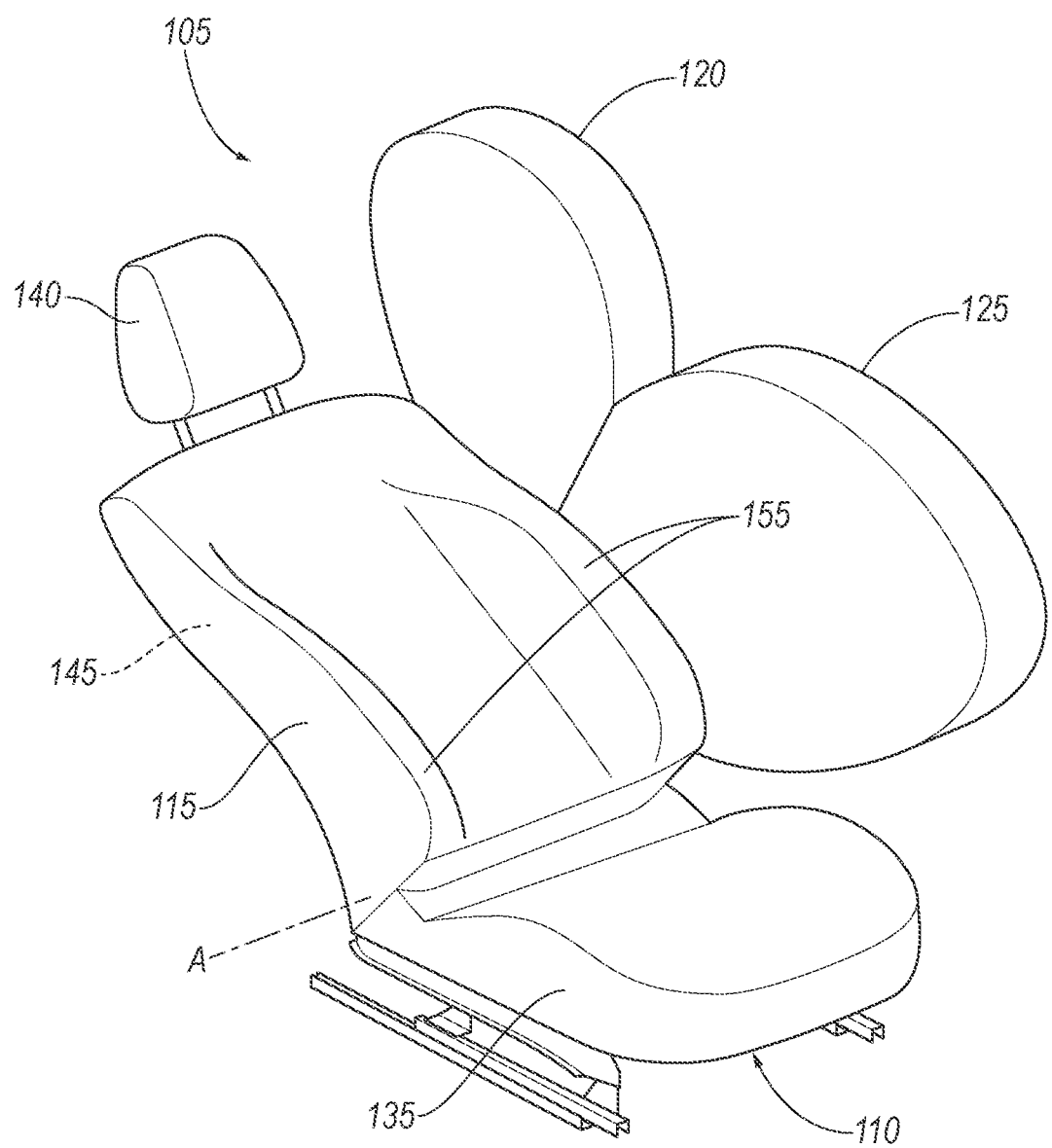
FIG. 2 is a perspective view of a seat of the vehicle in a reclined position with an upper airbag and a lower airbag in inflated positions.

The seat back 115 is rotatable, e.g., pivotable, relative to the seat bottom 135 to a plurality of angular positions. In other words, the seat back 115 may be disposed in any suitable angular position relative to the seat bottom 135. The seat back 115 is rotatable about a seat axis A relative to the seat bottom 135. For example, the seat back 115 may be in an upright position. In other words, the seat back 115 may be generally upright, i.e., orthogonal, relative to the seat bottom 135, as shown in FIG. 1. As another example, the seat back 115 may be in a reclined position. In other words, the seat back 115 may be reclined relative to the seat bottom 135, as shown in FIG. 2. In such an example, the seat back 115 may be oblique, i.e., neither parallel nor perpendicular, to the seat bottom 135.

The assembly 105 may include a position sensor 315. The position sensor 315 is programmed to detect an angular position of the seat back 115. That is, the position sensor 315 detects a recline angle $\alpha$ of the seat back 115 relative to the seat bottom 135, i.e., between an axis extending along the length of the seat back 115 and an axis in a seat-forward direction about the seat axis A. The assembly 105 may include any suitable number of position sensors 315, e.g., one position sensor 315 for each vehicle seat 110. The position sensor 315 may be mounted to any suitable component of the vehicle 100, e.g., the vehicle seat 110, a floor of the passenger compartment 130, etc. The position sensors 315 may be any suitable sensor in the vehicle seat 110 (e.g., rotary encoders, Hall-effect sensors, etc.) or exterior to the vehicle seat 110 (including cameras, image sensors, etc.).

The seat includes a covering 150. The covering 150 may include cushions or padding covered with upholstery. The cushions may be made of cushioning material, e.g., foam or any other suitable supportive material. The upholstery may be formed of cloth, leather, faux leather, or any other suitable material. The upholstery may be stitched in panels around the foam.

The seat back 115 and the seat bottom 135 of each of the vehicle seats 110 define an occupant seating area of the vehicle seats 110. The occupant seating area is the area occupied by an occupant when properly seated on the seat bottom 135 and the seat back 115. The occupant seating area is in a seat-forward direction of the seat back 115 and above the seat bottom 135.

The seat back 115 of the vehicle seat 110 may include a pair of bolsters 155 on opposite sides of the occupant seating area, i.e., the occupant seating area is between the bolsters 155. The bolsters 155 are spaced cross-seat from each other. The bolsters 155 are elongated, and specifically, are elongated along the length of the seat back 115. The bolsters 155 define cross-seat boundaries of the seat back 115, i.e., the seat back 115 terminates at the bolsters 155. The bolsters 155 may extend in a seat-forward direction relative to the occupant seating area, i.e., on opposite sides of the torso and shoulders of an occupant seated on the vehicle seat 110. The extension of the bolsters 155 relative to the occupant seating area may be defined by the upright frame members and/or the covering 150. In the example shown in the Figures, the size and shape of both the upright frame members and the covering 150 form the bolsters 155.

With reference to FIG. 2, the upper airbag 120 and lower airbag 125 may be formed of any suitable airbag material, for example, a woven polymer. For example, the upper airbag 120 and lower airbag 125 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

One or more inflators 320 may be connected to the upper airbag 120 and lower airbag 125. Upon receiving a signal from, e.g., a computer 605 (shown in FIG. 6), the inflators 320 may inflate the upper airbag 120 and lower airbag 125 with an inflation medium, such as a gas. The inflators 320 may be, for example, pyrotechnic inflators that use a chemical reaction to drive inflation medium to the upper airbag 120 and lower airbag 125. The inflators 320 may be of any suitable type, for example, cold-gas inflators. The assembly 105 may include one inflator 320 for each of the upper airbag 120 and lower airbag 125, e.g., fixed to and movable with the upper airbag 120 and lower airbag 125. Alternatively, the assembly 105 may include a single inflator 320 fixed to the seat frame 145 and connected to both the upper airbag 120 and lower airbag 125, e.g., via flexible fill tubes to accommodate the movement of the upper airbag 120 and lower airbag 125.

The upper airbag 120 and the lower airbag 125 are inflatable from uninflated positions inside the seat back 115 (as shown in FIG. 1) to inflated positions extending outward from the seat back 115 (as shown in FIG. 2). The upper airbag 120 and the lower airbag 125 in the uninflated positions are located inside or underneath the covering 150 of the seat back 115, e.g., one of the bolsters 155, e.g., the outboard bolster 155 relative to the vehicle 100. The covering 150 may include one or more tearaway seams that are opened by the inflation of the upper airbag 120 and lower airbag 125. The upper airbag 120 and the lower airbag 125 in the inflated positions are positioned laterally from an occupant sitting in the vehicle seat 110, e.g., between the occupant seating area and a door of the vehicle 100 in a cross-vehicle direction.

Figure 3:
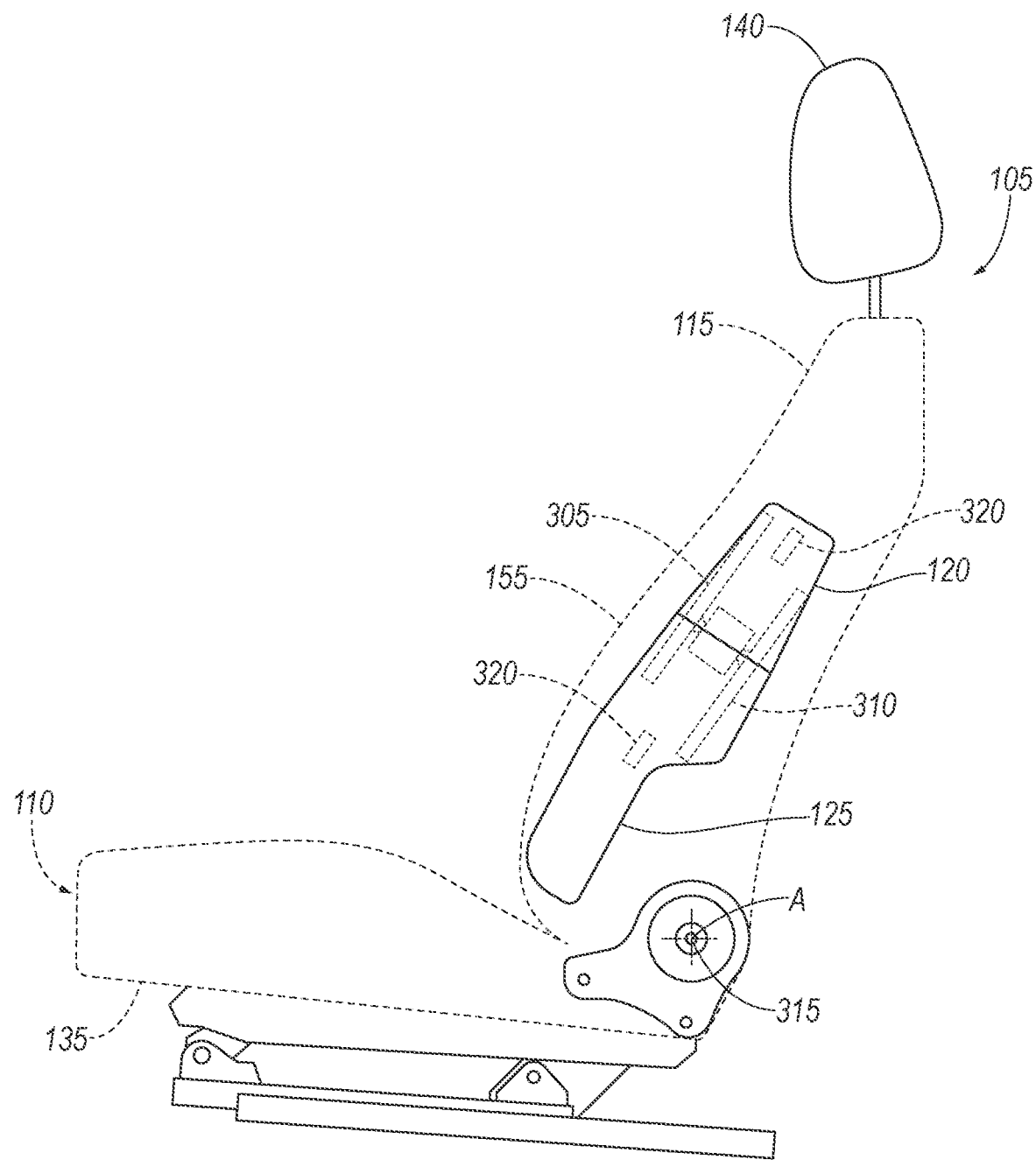
FIG. 3 is a side view of the seat in an upright position with the upper airbag and the lower airbag in uninflated positions.
Figure 4:
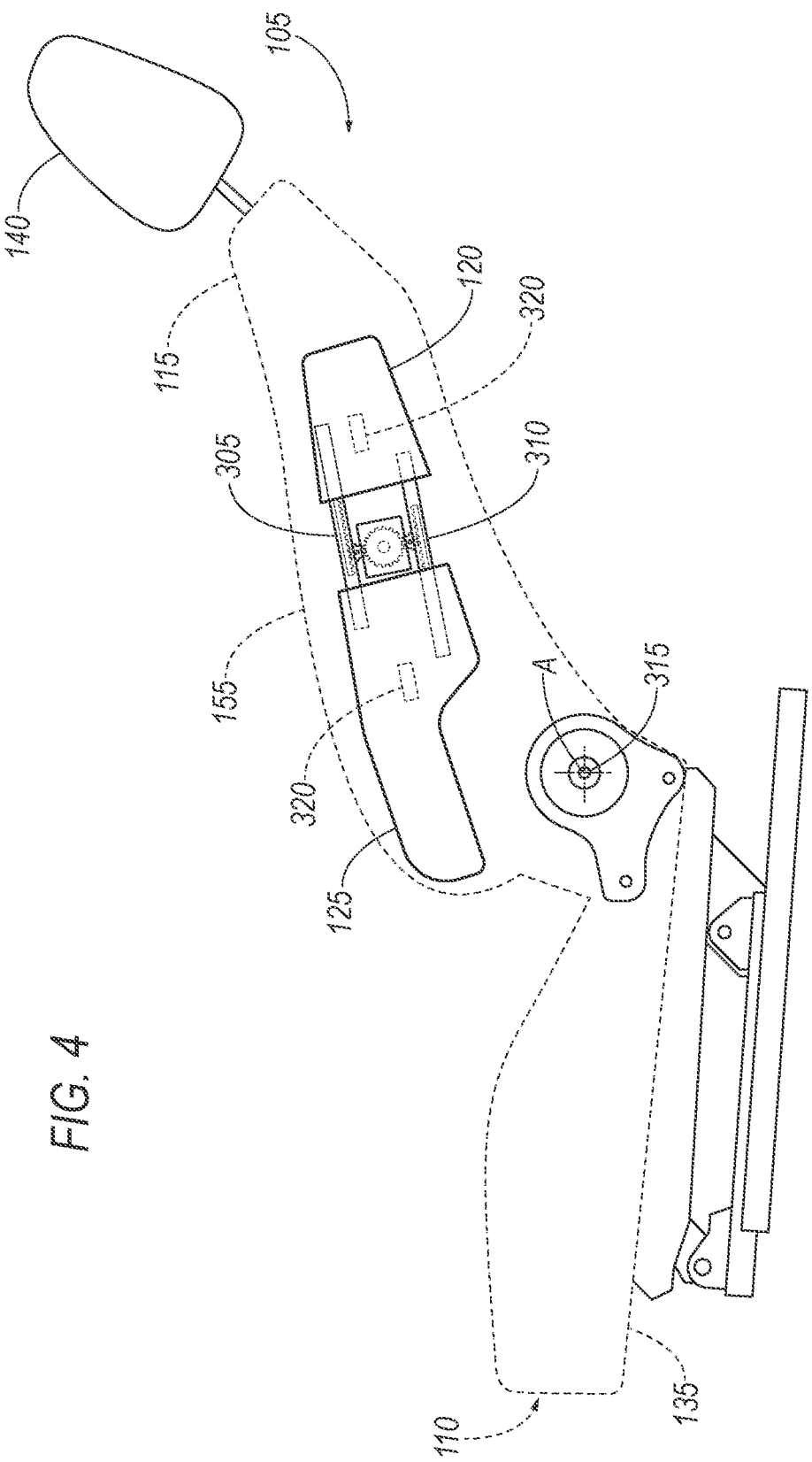
FIG. 4 is a side view of the seat in the reclined position with the upper airbag and the lower airbag in uninflated positions.

With reference to FIGS. 3-4, the assembly 105 includes the first track 305 and the second track 310. The first track 305 and the second track 310 may be mounted to the seat frame 145, e.g., an outboard side of the outboard upper frame member. The first track 305 and second track 310 may be located under the covering 150. The first track 305 and the second track 310 are elongated along the length of the seat back 115. The first track 305 and the second track 310 are elongated parallel to each other, e.g., collinear to each other or offset and parallel. The first track 305 and second track 310 may be distinct from each other or may be different segments of a single track. The first track 305 and the second track 310 are arranged in sequence along the length of the seat back 115 with the second track 310 closer to the seat axis A and the first track 305 farther from the seat axis A. The first track 305 and the second track 310 may have a uniform cross-section projected along the directions of elongation to facilitate components engaging with and sliding along the first track 305 and second track 310.

The upper airbag 120 is movable, e.g., slidable, along the first track 305, and the lower airbag 125 is movable, e.g., slidable, along the second track 310. The upper airbag 120 may be movable between a lowermost position at an end of the first track 305 closest to the seat axis A and an uppermost position at an end of the first track 305 farthest from the seat axis A. The lower airbag 125 may be movable between a lowermost position at an end of the second track 310 closest to the seat axis A and an uppermost position at an end of the second track 310 farthest from the seat axis A. The upper airbag 120 in any position to which the upper airbag 120 is movable along the first track 305 may be farther from the seat bottom 135, e.g., from the seat axis A, along the length of the seat back 115 than the lower airbag 125 in any position to which the lower airbag 125 is movable along the second track 310. For example, the upper airbag 120 in the lowermost position is farther from the seat bottom 135 than the lower airbag 125 in the uppermost position.

The upper airbag 120 and the lower airbag 125 are movable in opposite directions along the first track 305 and second track 310 between a retracted position and an extended position relative to each other. The upper airbag 120 and the lower airbag 125 are farther apart in the extended position than in the retracted position. For example, the retracted position may be when the lower airbag 125 is in the uppermost position and the upper airbag 120 is in the lowermost position, and the extended position may be when the lower airbag 125 is in the lowermost position and the upper airbag 120 is in the uppermost position.

Figure 5:
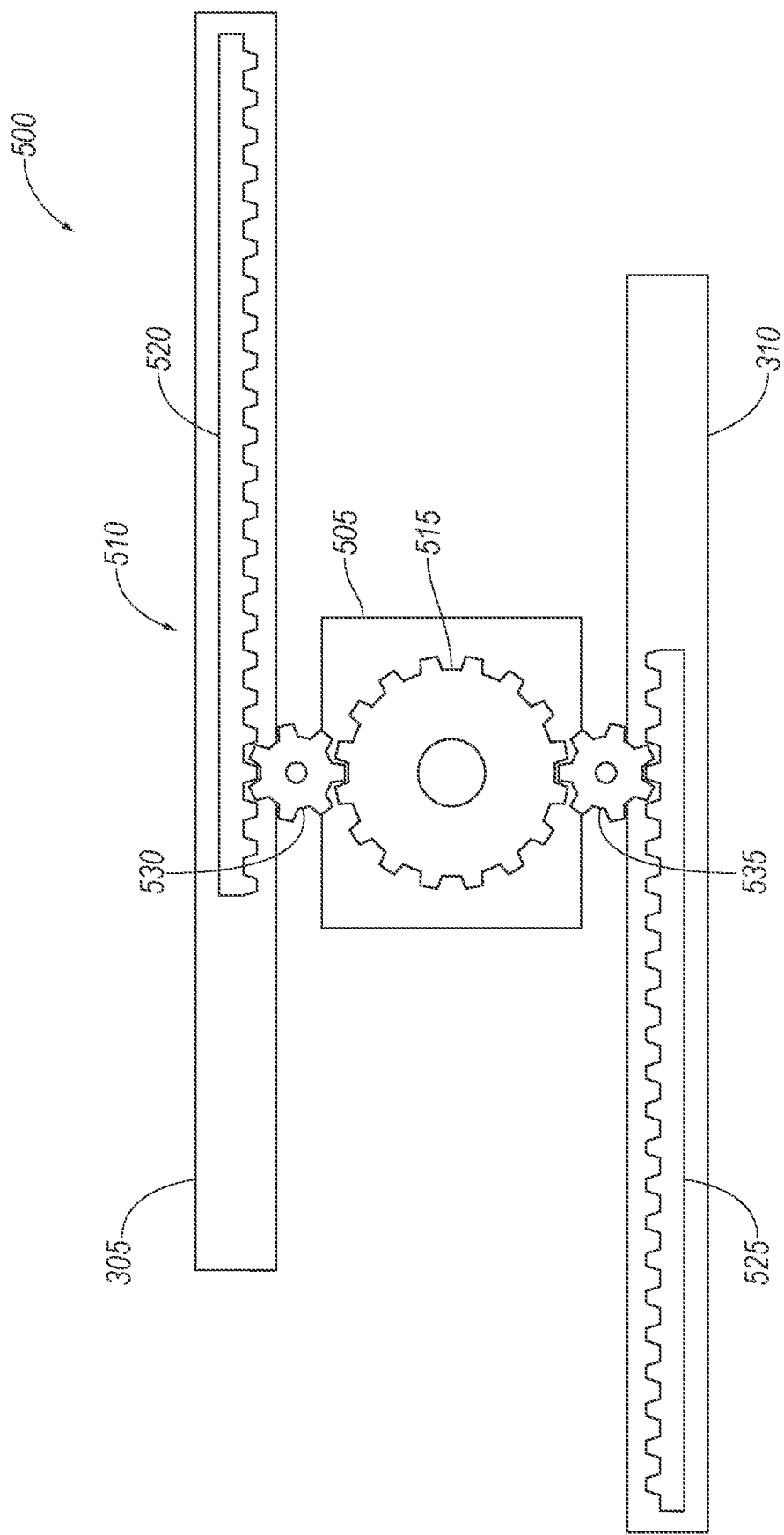
FIG. 5 is a diagram of a mechanical assembly of the seat.

With reference to FIG. 5, the assembly 105 includes the mechanical assembly 500. The mechanical assembly 500 is configured to simultaneously move the upper airbag 120 along the first track 305 and the lower airbag 125 along the second track 310 in opposite directions. For example, the mechanical assembly 500 may include a motor 505 and a gear assembly 510, as will be described below. For another example, the mechanical assembly 500 may include a system of gears and linkages without the motor 505. The gears and linkages may be connected to the seat bottom 135 and the seat back 115 such that reclining the seat pushes the upper airbag 120 and lower airbag 125 in opposite directions along the first track 305 and second track 310.

The motor 505 is arranged to drivably move, e.g., rotate, a component of the gear assembly 510, e.g., a driving gear 515 of the gear assembly 510. The motor 505 may be fixedly mounted to the seat frame 145 of the seat back 115. The motor 505 may be any suitable type, e.g., an electric motor.

The gear assembly 510 is configured to convert mechanical input, e.g., rotational input, from the motor 505 to simultaneous translational motion of the upper airbag 120 along the first track 305 and the lower airbag 125 along the second track 310 in opposite directions. The gear assembly 510 may include the driving gear 515, a first rack 520 slidable along the first track 305, and a second rack 525 slidable along the second track 310, with the first rack 520 and second rack 525 directly or indirectly engaged with the driving gear 515 such that rotational motion of the driving gear 515 converts to translational motion of the first rack 520 in one direction and translational motion of the second rack 525 in an opposite direction. The driving gear 515 may be, e.g., a spur gear. The upper airbag 120 is mounted to the first rack 520, and the lower airbag 125 is mounted to the second rack 525 (as shown in FIGS. 3-4). For example, the first rack 520 and the second rack 525 may be directly engaged with the driving gear 515 on opposite sides of the driving gear 515. For another example, the gear assembly 510 may include intermediate gears between the driving gear 515 and the first rack 520 and second rack 525 to the change rotation direction, speed, and/or torque of the mechanical energy. The gear assembly 510 may include a first pinion gear 530 engaged with the first rack 520 and a second pinion gear 535 engaged with the second rack 525. The first pinion gear 530 and second pinion gear 535 are drivable by the motor 505, e.g., via engagement with the driving gear 515. The first pinion gear 530 and second pinion gear 535 may be spur gears.

Figure 6:
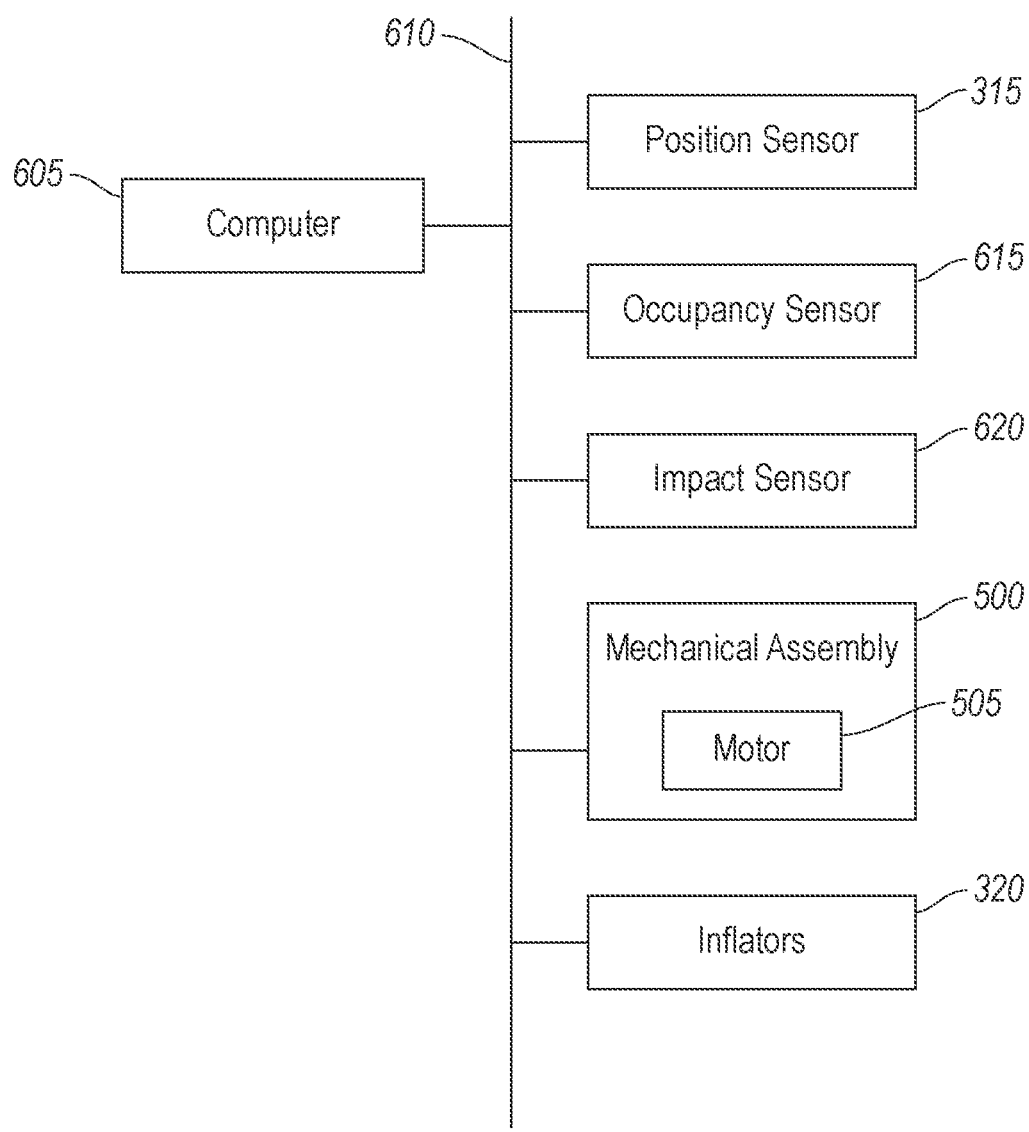
FIG. 6 is a block diagram of a control system for the seat.

With reference to FIG. 6, the assembly 105 may include the computer 605, a communications network 610, an occupancy sensor 615, and an impact sensor 620. The computer 605 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 605 can thus include a processor, a memory, etc. The memory of the computer 605 can include media for storing instructions executable by the processor as well as for electronically storing data and/or databases, and/or the computer 605 can include structures such as the foregoing by which programming is provided. The computer 605 can be multiple computers coupled together. For example, the computer 605 may be a restraint control module.

The computer 605 may transmit and receive data through the communications network 610, e.g., a controller area network (CAN) bus, Ethernet, WiFi, Local Interconnect Network (LIN), onboard diagnostics connector (OBD-II), and/or any other wired or wireless communications network. The computer 605 may be communicatively coupled to the position sensor 315, the occupancy sensor 615, the impact sensor 620, the inflator(s) 320, the mechanical assembly 500 (e.g., the motor 505), and other components via the communications network 610.

The occupancy sensors 615 are configured to detect occupancy of the seats. The occupancy sensors 615 may be visible-light or infrared cameras directed at the seats, weight sensors inside the seats, sensors detecting whether seatbelts for the seats are buckled, or other suitable sensors.

The impact sensor 620 is adapted to detect certain impacts to the vehicle 100. The impact sensor 620 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 620 may be located at numerous points in or on the vehicle 100.

The computer 605 may be programmed to actuate the mechanical assembly 500 to move the upper airbag 120 along the first track 305 and the lower airbag 125 along the second track 310 in opposite directions. For example, the computer 605 may instruct the motor 505 to rotate in a first direction (e.g., clockwise) to move the upper airbag 120 and lower airbag 125 from the retracted position to the extended position, and to rotate in a second direction (e.g., counter-clockwise) to move the upper airbag 120 and lower airbag 125 from the extended position to the retracted position. The computer 605 may instruct the motor 505 to rotate for a preset time to fully move the upper airbag 120 and lower airbag 125 between the retracted position and extended position.

The computer 605 may be programmed to actuate the mechanical assembly 500 to move the upper airbag 120 along the first track 305 and the lower airbag 125 along the second track 310 in opposite directions based on the recline angle $\alpha$ of the seat back 115. The computer 605 may move the upper airbag 120 and the lower airbag 125 farther apart, e.g., to the extended position, in response to an increase in the recline angle $\alpha$, and the computer 605 may move the upper airbag 120 and the lower airbag 125 closer together, e.g., to the retracted position, in response to a decrease in the recline angle $\alpha$. For example, the computer 605 may move the upper airbag 120 and the lower airbag 125 to the extended position in response to the recline angle $\alpha$ exceeding a threshold angle $\alpha_{th}$, and the computer 605 may move the upper airbag 120 and the lower airbag 125 to the retracted position in response to the recline angle $\alpha$ being below the threshold angle $\alpha_{th}$. The threshold angle $\alpha_{th}$ may be chosen based on typical positioning of the occupant at different recline angles $\alpha$, specifically positioning of the pelvis and head of the occupant at different recline angles $\alpha$. The threshold angle $\alpha_{th}$ may be less than, e.g., 30° for nonautonomous or semi-autonomous vehicles, and the threshold angle $\alpha_{th}$ may be greater or less than 30° for fully autonomous vehicles, in conjunction with other safety features to address large recline angles $\alpha$. For another example, the computer 605 may move the upper airbag 120 and the lower airbag 125 to respective positions that are functions, e.g., continuous linear functions, of the recline angle $\alpha$, e.g., $x_1=f(\alpha)$ and $x_2=-f(\alpha)$, in which $x_1$ is the position of the upper airbag 120 along the first track 305 and $x_2$ is the position of the lower airbag 125 along the second track 310.

Figure 7:
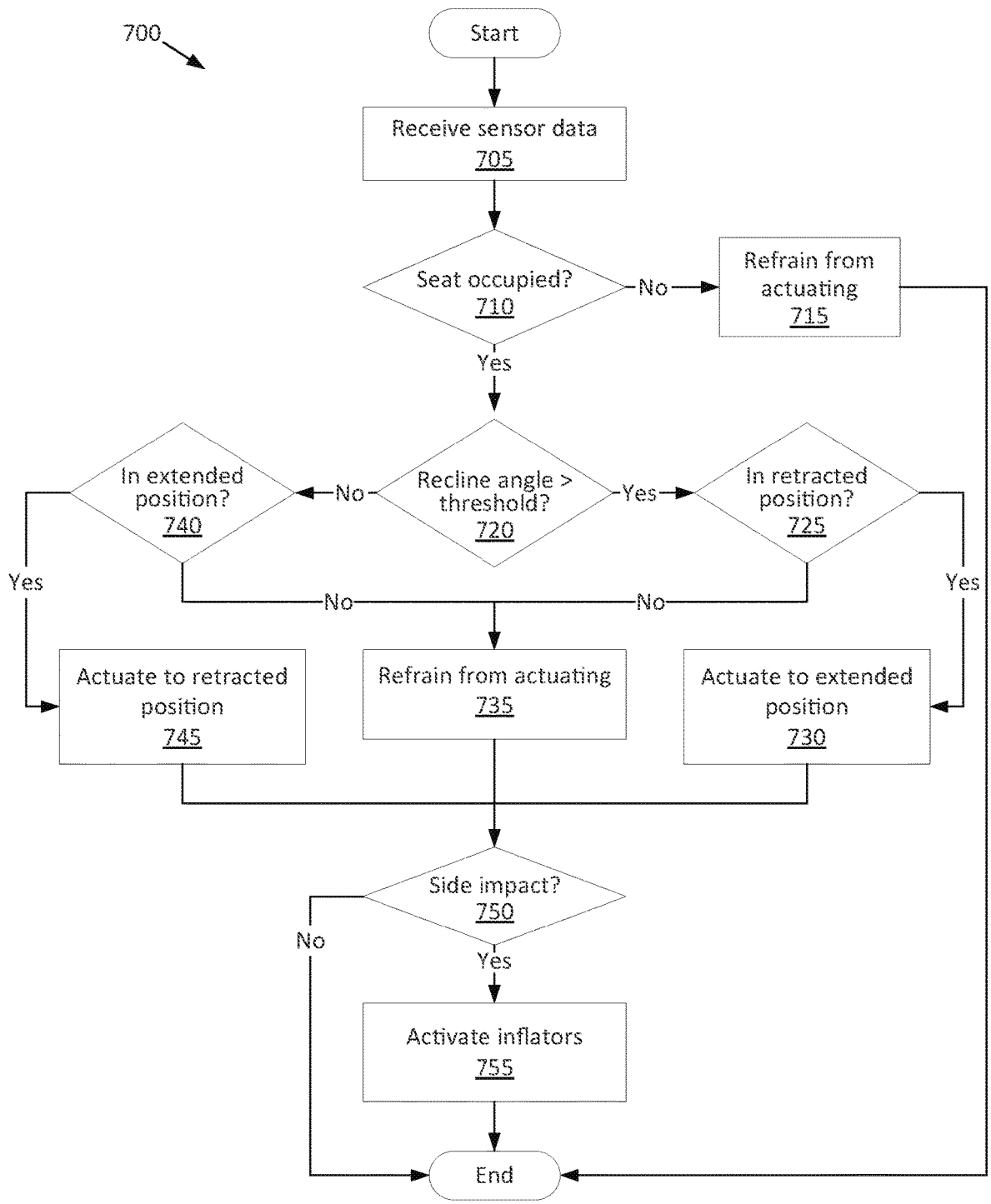
FIG. 7 is a flowchart of an example process for controlling the upper airbag and lower airbag in the seat.

FIG. 7 is a flowchart illustrating an example process 700 for controlling the upper airbag 120 and the lower airbag 125. The memory of the computer 605 stores executable instructions for performing the steps of the process 700 and/or programming can be implemented in structures such as mentioned above. The computer 605 may execute the process 700 independently for each of the vehicle seats 110. The computer 605 may execute the process 700 continuously while the vehicle 100 is on. As a general overview of the process 700, the computer 605 receives sensor data. If the vehicle seat 110 is not occupied, the computer 605 refrains from actuating the motor 505 and the inflator(s) 320. If the vehicle seat 110 is occupied, the computer 605 determines whether the recline angle $\alpha$ is above or below the threshold angle $\alpha_{th}$. If above, the computer 605 actuates the motor 505 to move the upper airbag 120 and lower airbag 125 to the extended position if not already in the extended position and refrains from actuating otherwise. If below, the computer 605 actuates the motor 505 to move the upper airbag 120 and lower airbag 125 to the retracted position if not already in the retracted position and refrains from actuating otherwise. In the event of the sensor data indicating a side impact, the computer 605 activates the inflator(s) 320 to inflate the upper airbag 120 and lower airbag 125.

The process 700 begins in a block 705, in which the computer 605 receives data indicating the recline angle $\alpha$ from the position sensor 315, data indicating an occupancy status of the vehicle seat 110 from the occupancy sensor 615, and data from the impact sensor 620.

Next, in a decision block 710, the computer 605 determines whether the vehicle seat 110 is occupied based on the data from the occupancy sensor 615. In response to data indicating a lack of an occupant seated in the vehicle seat 110, the process 700 proceeds to a block 715. In response to data indicating a presence of an occupant seated in the vehicle seat 110, the process 700 proceeds to a decision block 720.

In the block 715, the computer 605 refrains from actuating the mechanical assembly 500 and refrains from actuating the inflator(s) 320. After the block 715, the process 700 ends.

In the decision block 720, the computer 605 determines whether the recline angle α indicated by the position sensor 315 is greater or less than the threshold angle $\alpha_{th}$. In response to the recline angle α exceeding the threshold angle $\alpha_{th}$, i.e., the seat back 115 being more reclined than the threshold angle $\alpha_t$, the process 700 proceeds to a decision block 725. In response to the recline angle α being below the threshold angle $\alpha_{th}$, i.e., the seat back 115 being less reclined than the threshold angle $\alpha_{th}$, the process 700 proceeds to a decision block 740.

In the decision block 725, the computer 605 determines whether the upper airbag 120 and lower airbag 125 are in the extended position or the retracted position. In response to the upper airbag 120 and lower airbag 125 being in the retracted position, the process 700 proceeds to a block 730. In response to the upper airbag 120 and lower airbag 125 being in the extended position, the process 700 proceeds to a block 735.

In the block 730, the computer 605 actuates the mechanical assembly 500 to move the upper airbag 120 along the first track 305 and the lower airbag 125 along the second track 310 in opposite directions to the extended position, as described above. After the block 730, the process 700 proceeds to a decision block 750.

In the block 735, the computer 605 refrains from actuating the mechanical assembly 500. After the block 735, the process 700 proceeds to a decision block 750.

In the decision block 740, the computer 605 determines whether the upper airbag 120 and lower airbag 125 are in the extended position or the retracted position. In response to the upper airbag 120 and lower airbag 125 being in the extended position, the process 700 proceeds to a block 745. In response to the upper airbag 120 and lower airbag 125 being in the retracted position, the process 700 proceeds to the block 735 to refrain from actuating as just described.

In the block 745, the computer 605 actuates the mechanical assembly 500 to move the upper airbag 120 along the first track 305 and the lower airbag 125 along the second track 310 in opposite directions to the retracted position, as described above. After the block 745, the process 700 proceeds to a decision block 750.

In the decision block 750, the computer 605 determines whether the data from the impact sensor 620 indicates a side impact to the vehicle 100. In response to data indicating a side impact to the vehicle 100, the process 700 proceeds to a block 755. In response to data not indicating a side impact to the vehicle 100, the process 700 ends by refraining from actuating the inflator(s) 320.

In the block 755, the computer 605 inflates the upper airbag 120 and the lower airbag 125 from the uninflated positions to the inflated positions by actuating the inflator(s) 320. After the block 755, the process 700 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a vehicle seat including a seat back;
   a first track mounted to the seat back;
   an upper airbag movable along the first track;
   a second track mounted to the seat back;
   a lower airbag movable along the second track; and
   a mechanical assembly configured to simultaneously move the upper airbag along the first track and the lower airbag along the second track in opposite directions.

2. The assembly of claim 1, further comprising a computer communicatively coupled to the mechanical assembly, wherein the computer is programmed to actuate the mechanical assembly to move the upper airbag along the first track and the lower airbag along the second track in opposite directions.

3. The assembly of claim 2, wherein the computer is programmed to actuate the mechanical assembly to move the upper airbag along the first track and the lower airbag along the second track in opposite directions based on a recline angle of the seat back.

4. The assembly of claim 3, further comprising a position sensor communicatively coupled to the computer, wherein the computer is further programmed to receive data indicating the recline angle from the position sensor.

5. The assembly of claim 3, wherein the computer is further programmed to move the upper airbag and the lower airbag farther apart in response to an increase in the recline angle, and move the upper airbag and the lower airbag closer together in response to a decrease in the recline angle.

6. The assembly of claim 3, wherein the computer is further programmed to move the upper airbag and the lower airbag to an extended position in response to the recline angle exceeding a threshold angle.

7. The assembly of claim 6, wherein the computer is further programmed to move the upper airbag and the lower airbag to a retracted position in response to the recline angle being below the threshold angle, and the upper airbag and the lower airbag are farther apart in the extended position than in the retracted position.

8. The assembly of claim 2, wherein the computer is programmed to refrain from actuating the mechanical assembly in response to data indicating a lack of an occupant seated in the vehicle seat.

9. The assembly of claim 1, wherein the mechanical assembly includes a motor and a gear assembly, and the gear assembly is configured to convert mechanical input from the motor to simultaneous translational motion of the upper airbag along the first track and the lower airbag along the second track in opposite directions.

10. The assembly of claim 9, wherein the gear assembly includes a first rack slidable along the first track and a second rack slidable along the second track, the upper airbag is mounted to the first rack, and the lower airbag is mounted to the second rack.

11. The assembly of claim 10, wherein the gear assembly includes a first pinion gear drivable by the motor and engaged with the first rack and a second pinion gear drivable by the motor and engaged with the second rack.

12. The assembly of claim 1, wherein the vehicle seat includes a seat bottom, the seat back is rotatable about a seat axis relative to the seat bottom, the seat back has a length extending perpendicular to the seat axis, and the first track and the second track are elongated along the length of the seat back.

13. The assembly of claim 12, wherein the upper airbag in any position to which the upper airbag is movable along the first track is farther from the seat bottom along the length than the lower airbag in any position to which the lower airbag is movable along the second track.

14. The assembly of claim 1, wherein the first track and the second track are elongated parallel to each other.

15. The assembly of claim 1, wherein the upper airbag and the lower airbag are inflatable from uninflated positions inside the seat back to inflated positions extending outward from the seat back.

16. The assembly of claim 15, wherein the upper airbag and the lower airbag in the inflated positions are positioned laterally from an occupant sitting in the vehicle seat.

17. The assembly of claim 15, further comprising a computer, wherein the computer is programmed to inflate the upper airbag and the lower airbag from the uninflated positions to the inflated positions in response to data indicating a side impact to a vehicle including the assembly.

18. A computer comprising a processor and a memory, the memory storing instructions executable to:
   simultaneously move an upper airbag along a first track and a lower airbag along a second track in opposite directions based on a recline angle of a seat back of a vehicle seat, the first track and the second track being mounted to the seat back.

19. A method comprising:
   simultaneously moving an upper airbag along a first track and a lower airbag along a second track in opposite directions based on a recline angle of a seat back of a vehicle seat, the first track and the second track being mounted to the seat back.

\* \* \* \* \*